United States Patent Office 3,151,102
Patented Sept. 29, 1964

3,151,102
METHOD OF POLYMERIZATION USING A GRIGNARD REAGENT/KETONE CATALYST COMPLEX TO PRODUCE CRYSTALLINE METHACRYLATE POLYMERS
Abraham Kutner, Newark, Del., assignor to Hercules Powder Company, Wilmington, Del., a corporation of Delaware
No Drawing. Filed Dec. 5, 1958, Ser. No. 778,286
9 Claims. (Cl. 260—89.5)

This invention relates to an improved method for making crystallizable polymers from which crystalline poly(methyl methacrylate) and crystalline poly(methyl haloacrylate) are readily isolated.

Polymers exhibiting the phenomena of crystallization are known in the art. Such polymers are fusible, moldable, and extrudable, and when melted and rapidly cooled are initially amorphous but may be crystallized by various known techniques. The crystalline polymers have higher service temperatures and greater strength but lower flexibility and transparency than the corresponding amorphous polymers, and the advantages in their utilization stem from these improved properties. Polymerization methods for the production of crystallizable polymers vary according to the monomeric material polymerized, and the catalysts used tend to be specific for the particular monomeric material subjected to the process.

A crystallizable poly(methyl methacrylate) can be produced by treatment with solvents which cause swelling of the amorphous crystallizable poly(methyl methacrylate). If the degree of crystallinity in the polymer chains is sufficiently high, a crystalline polymer is separable and the polymer which will yield this crystalline polymer is referred to herein as a crystallizable polymer.

Crystallizable poly(methyl haloacrylates), on the other hand, have not been produced and crystalline poly(methyl haloacrylates) are unknown in the art.

In accordance with the present invention, it has now been found that readily crystallizable poly(methyl methacrylate) and readily crystallizable poly(methyl haloacrylate) are produced by contacting methyl methacrylate or methyl haloacrylate with a catalyst produced by reacting a Grignard reagent, RMgX, in which X is a halogen and R is a hydrocarbon radical of 1 to 18 carbon atoms with a ketone of the formula

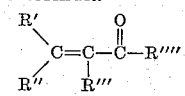

in which R', R" and R''' are selected from the group consisting of hydrocarbon radicals of 1 to 8 carbon atoms and hydrogen, and R'''' is a hydrocarbon radical of 1 to 18 carbon atoms.

The following specific examples illustrate the process of this invention and the manner of carrying out the polymerization. All parts and percentages are by weight unless otherwise indicated, and parts and moles are in the same units.

EXAMPLES

An ether solution of Grignard reagent was prepared by reacting a hydrocarbon halide in a nitrogen atmosphere with an equimolecular amount of magnesium turnings in ether to which a trace of iodine was added. The ether solution was allowed to settle so as to get a clear solution, and this was analyzed and used in the form of an ether solution for the reaction with the ketone.

A measured amount of this Grignard reagent and a measured amount of the indicated ketone were mixed together to form the catalyst. The reaction forming the catalyst is rapid and was completed by heating at 30–35° C. Methyl methacrylate (or methyl haloacrylate) and dry solvent were then added in measured amounts, and the resulting mixture was held at a given temperature for varying periods of time. The polymer was recovered by treatment with an alcohol and it was purified by maceration in alcohol acidified with hydrochloric acid and in alcohol. The polymer was then dried and weighed. It was tested for degree of crystallizability by soaking in methyl isobutyl ketone alone or in admixture with ⅕ part of heptane for twenty hours and then determining the intensity and type of X-ray pattern. The reduced specific viscosity at a concentration of 0.1% in ethylene chloride was also determined.

The data on specific examples are set forth in the table. In all cases the X-ray pattern showed only one type of crystallinity for each of the different polymers in the tabulated examples as well as in the numerous variations of Grignard reagent and ketone in preparing the catalyst and in the wide variation of reaction conditions. In the various examples it is shown that high conversions to polymers of high viscosity are possible with this catalyst. The viscosity is expressed as RSV (reduced specific viscosity) which was determined on a 0.1% solution of the polymer dissolved in ethylene chloride at 25° C.

Table

| Example | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Catalyst (Millimols) | | | | | | | | | | | | | | | | | |
| Benzalacetophenone | 1 | | 2 | 2 | 1 | 1.5 | 2 | 2 | 1 | 1 | 1 | 1 | 2 | 1 | 1 | 3 | 0.5 |
| Dibenzalacetone | | 1 | | | | | | | | | | | | | | | |
| $C_2H_5MgCl$ | 1 | 1.65 | | | | | 2 | 2 | 1 | 1 | 1 | 1 | 2 | 1 | 1 | 3.6 | 0.5 |
| $C_2H_5MgBr$ | | | 2 | | | | | | | | | | | | | | |
| $(CH_3)_2CHMgCl$ | | | | 2 | | | | | | | | | | | | | |
| $C_6H_5MgCl$ | | | | | 1 | | | | | | | | | | | | |
| $CH_3MgI$ | | | | | | 2 | | | | | | | | | | | |
| Solvents (Parts): | | | | | | | | | | | | | | | | | |
| Heptane | 16.8 | 13 | 60 | 30.5 | 30.5 | 31 | 15 | 15 | 15 | 16 | 46.5 | 76 | | 1.9 | 15 | 28 | 8 |
| Toluene | | 2.6 | | | | | | | | | | | 36.9 | | | | |
| Ether | 0.5 | 2.3 | 2.7 | 4.2 | 2.1 | 3.4 | 1.7 | 1.7 | 1.7 | 1.2 | 5.0 | 8.5 | 5.3 | 15.8 | 2.3 | 3.7 | 1 |
| Monomer (Parts): | | | | | | | | | | | | | | | | | |
| Methyl Methacrylate | 10 | 10 | 20 | 20 | 20 | 20 | 10 | 10 | 10 | 10 | 30 | 50 | 10 | 10 | 10 | | |
| Methyl Chloroacrylate | | | | | | | | | | | | | | | | 20 | |
| Methyl Bromoacrylate | | | | | | | | | | | | | | | | | 3.8 |
| Polymerization: | | | | | | | | | | | | | | | | | |
| Temperature, ° C | 30 | 30 | 30 | 30 | 30 | 30 | −30 | 0 | 50 | 68 | 30 | 30 | 30 | 30 | 30 | 30 | 30 |
| Time (hours) | 20 | 20 | 20 | 20 | 20 | 20 | 21 | 21 | 5 | 1 | 20 | 20 | 20 | 20 | 20 | 20 | 20 |
| Conversion (percent) | 100 | 94 | 78 | 89 | 13.6 | 19.8 | 51 | 91 | 100 | 96 | 100 | 74 | 100 | 100 | 87 | 67 | 11.3 |
| RSV | 3.92 | 8.14 | 8.43 | 7.88 | 2.34 | 3.5 | 2.36 | 7.7 | 5.47 | 6.3 | 14.1 | 15.3 | 6.0 | 15.1 | 7.66 | 1.97 | 0.84 |

The catalyst of this invention is the complex produced by the combination or reaction of a Grignard reagent of formula RMgX, wherein X is a halogen (chlorine, bromine or iodine) and R is a hydrocarbon radical, with a ketone of the formula

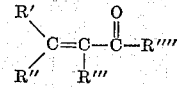

wherein R', R" and R'" are hydrogen or hydrocarbon radicals of 1 to 8 carbon atoms and R"" is a hydrocarbon radical of 1 to 18 carbon atoms. Examples of the hydrocarbon radicals are: methyl, ethyl, isopropyl, butyl, isobutyl, t-butyl, pentyl, hexyl, octyl, cyclopentyl, cyclohexyl, styryl, propenyl, octadecyl, benzyl, phenyl and tolyl. One of R' and R" is preferably a hydrocarbon radical.

Specific examples of the Grignard reagents useful in this invention are: methyl magnesium iodide, ethyl magnesium chloride, isopropyl magnesium chloride, phenyl magnesium bromide, benzyl magnesium chloride, cyclohexyl magnesium chloride, tolyl magnesium chloride, p-methyl phenyl magnesium chloride, propenyl magnesium chloride.

Specific examples of ketones from which the catalyst of this invention is produced are:

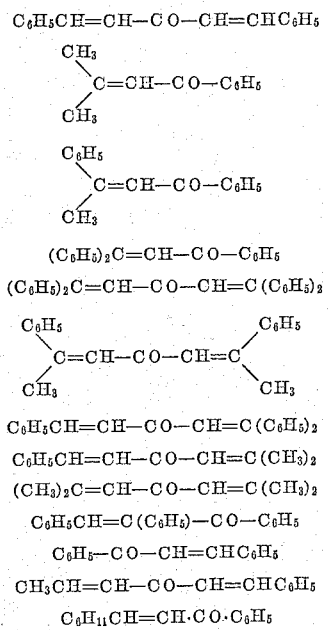

The reaction between the ketone and the Grignard reagent is effected in the usual manner for effecting a reaction between such reagents using solvents and temperatures of reaction well known in the art. Thus dry solvents such as ether, pentane, dioxane, or benzene may be used and the ether in which the Grignard reagent is produced may be displaced partially or entirely by another solvent before reacting with the ketone. A satisfactory temperature range for producing the catalyst is 20° C. to 150° C. but a much wider range may be used since the temperature is not critical. As is usual in Grignard reactions, Grignard reagent-reactive substances are avoided, and dry reagents and an inert atmosphere are used. The catalyst is used in the form of the complex produced by combining the Grignard reagent and ketone without further chemical treatment. Its exact chemical structure is not known but it appears to be the addition product of one mole of Grignard reagent and one mole of ketone. If an excess of ketone is used, it does not act as an inert solvent, however, since it weakens the activity of the catalyst complex. If a small excess of Grignard reagent is used, the catalyst is a mixture of the catalyst of this invention and other complexes. An excess of Grignard reagent in the catalyst mixture may be tolerated but is not desired since more than about a 75% excess gives a crystallizable product which has a less definite X-ray pattern. It is preferred to use approximately a 1:1 mole ratio of Grignard reagent and ketone for this reason.

While no solvent is necessary in the polymerization process of this invention, the Grignard reagent-ketone complex is added for convenience in the solvent in which it is produced. However, the solvent may be distilled off if desired and the solid catalyst may be added to the liquid methyl methacrylate monomer. It is desirable to use a solvent in the polymerization process to aid in the production of a more uniform product. Solvents which may be used include the lower volatile ethers such as ethyl ether, diisopropyl ether and mixed ethers such as ethyl isopropyl ether; aliphatic hydrocarbons such as ethane, propane, butane, pentanes, hexane, heptane and octanes; cyclic hydrocarbons such as cyclopentane, methyl cyclopentane, and cyclohexane; aromatic hydrocarbons such as benzene, toluene, and the xylenes; and mixtures.

When aromatic solvents are used, the polymer is usually in solution and may be recovered by diluting with an aliphatic hydrocarbon to effect its precipitation.

The amount of Grignard reagent-ketone complex used as a catalyst may be selected from the range of 0.05 to 5 mol per 100 mol of monomer to be polymerized. The larger amounts give more rapid polymerization than the smaller amounts and result in polymers of lower viscosity. In the preferred temperature range, the preferred amount of catalyst is 0.2 to about 2.0 mol.

The temperature influences the rate of polymerization and the molecular weight of the polymer, high temperatures in the range of 100° C. giving a lower viscosity polymer than lower temperatures. The temperature may be in the range of −60° C. to about 100° C. for the production of crystalline solid polymers, but a temperature in the range of about 0° C. to about 50° C. is preferred. At temperatures above about 100° C. low molecular weight polymers are produced, and the amount of crystalline polymer is thus too low to separate from the resinous polymer in the mixture. The most practical temperature range is 0° C. to about 30° C. Temperatures below about 0° C. require a longer polymerization time.

The polymer produced in the process of this invention is freed of the catalyst complex by steeping in alcohol preferably with maceration followed by contacting with alcoholic hydrochloric acid and finally washing with water. The product is generally dried by washing with alcohol to remove occluded water and then evaporating the alcohol. Many variations of this general procedure are obvious to one skilled in purification of polymeric materials. The polymer as so treated when produced by this process is either crystalline without further treatment or becomes crystalline if allowed to steep in a methyl isobutyl ketone-hexane (5:1 ratio) solution.

The methyl methacrylate and methyl haloacrylates polymerized in accordance with this invention are alpha-substituted acrylates. The process of Example 16 also gives a crystallizable polymer when applied to methyl fluoroacrylate as the monomer.

The crystalline polymers prepared from the crystallizable polymers produced by the process of this invention are readily identified by X-ray diffraction spectra. The following X-ray diffraction data serve for identification of these crystalline polymers.

| Poly(Methyl Methacrylate) | | Poly(Methyl Chloroacrylate) | | Poly(Methyl Bromoacrylate) | |
|---|---|---|---|---|---|
| Line (A.) | Relative [1] intensity | Line (A.) | Relative [1] intensity | Line (A.) | Relative [1] intensity |
| 10.5 | 8 | 9.2 | 10 | 8.0 | 0.5 |
| 6.3 | 10 | 7.6 | 8 | 7.25 | 10 |
| 5.3 | 5 | 6.0 | 6 | 4.75 | 2 |
| 4.4 | 2 | 5.45 | 8 | 4.55 | 2 |
| 3.3 | 3 | 4.60 | [2] 1 | 4.05 | 1 |
| 2.95 | 0.5 | 3.55 | [2] 1 | 3.65 | 1 |
| 2.78 | 2 | 3.12 | [2] 2 | 3.33 | 2 |
|  |  | 2.88 | [2] 1 | 3.15 | 1 |

[1] 10=strongest intensity, 0=background density of exposed film.
[2] Broad.

These values are found to be fairly uniform regardless of the difference in molecular weight of various samples within the limits of experimental error which may be as high as 5%.

The catalyst of this invention has two unique properties requisite for the production of a crystallizable polymer in high yield. First, it has the property of directing the orientation of the polymer toward a uniformity of configuration along the chain so that a single type of crystalline pattern is attained. Secondly, it has a degree of activity for producing a polymer of high molecular weight at ordinary temperatures. This is particularly observable in the case of methyl methacrylate. Without these properties, the polymer formed would not be readily crystallizable or be obtained in high yield as a polymer of high viscosity.

The crystallizable polymers produced in accordance with this invention can be used in the preparation of fibers, films, coatings and molded articles of improved properties. The higher melting point of fibers and films of the crystallized polymers is particularly advantageous. The crystallized polymer coatings additionally have greater cohesive properties than non-crystalline polymers and also diffuse sunlight so that there is greater resistance to outdoor weathering. The crystallinity in lacquers may be developed by solvent swelling or on aging in normal usage and exposure to the heat of the sun.

What I claim and desire to protect by Letters Patent is:

1. The method of preparing a readily crystallizable polymer which comprises contacting a monomer of the group consisting of methyl methacrylate and methyl haloacrylate at a temperature in the range of about −60° to about 100° C. in an inert atmosphere with from about 0.5 to about 50 millimoles per mole of said monomer of a Grignard reagent-ketone catlyst complex produced by mixing a Grignard reagent, RMgX, in which X is a halogen and R is a hydrocarbon radical of 1 to 18 carbon atoms with a ketone of the formula

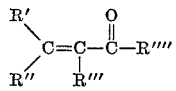

in which R′, R″ and R‴ are selected from the group consisting of hydrogen and hydrocarbon radicals of 1 to 8 carbon atoms, and R‴′ is a hydrocarbon radical of 1 to 18 carbon atoms, in a molar ratio of Grignard reagent to ketone of from about 1:1 to about 1.75:1.

2. The method of claim 1 in which the ketone of the catalyst complex is benzalacetophenone.

3. The method of claim 1 in which the ketone of the catalyst complex is dibenzalacetone.

4. The method of preparing a readily crystallizable polymer which comprises contacting a monomer of the group consisting of methyl methacrylate and methyl haloacrylate at a temperature in the range of about −60° to about 100° C. in an inert atmosphere with from about 0.5 to about 50 millimoles per mole of said monomer of a catalyst complex formed by the combination of ethyl magnesium chloride with benzalacetophenone, in a molar ratio of from about 1:1 to about 1.75:1.

5. The method of preparing a readily crystallizable polymer which comprises contacting a monomer of the group consisting of methyl methacrylate and methyl haloacrylate at a temperature in the range of about −60° to about 100° C. in an inert atmosphere with from about 0.5 to about 50 millimoles per mole of said monomer of a catalyst complex formed by the combination of ethyl magnesium chloride and dibenzalacetone, in a molar ratio of from about 1:1 to about 1.75:1.

6. The method of preparing a readily crystallizable poly(methyl methacrylate) which comprises contacting methyl methacrylate at a temperature in the range of about −60° to about 100° C. in an inert atmosphere with from about 0.5 to about 50 millimoles per mole of methyl methacrylate of a catalyst complex formed by the combination of phenyl magnesium chloride with benzalacetophenone, in a molar ratio of from about 1:1 to about 1.75:1.

7. The method of preparing a readily crystallizable poly(methyl methacrylate) which comprises contacting methyl methacrylate at a temperature in the range of about −60° to about 100° C. in an inert atmosphere with from about 0.5 to about 50 millimoles per mole of methyl methacrylate of a catalyst complex formed by the combination of isopropyl magnesium chloride with benzalacetophenone, in a molar ratio of from about 1:1 to about 1.75:1.

8. The method of preparing a readily crystallizable poly(methyl methacrylate) which comprises contacting methyl methacrylate at a temperature in the range of about −60° to about 100° C. in an inert atmosphere with from about 0.5 to about 50 millimoles per mole of methyl methacrylate of a catalyst complex formed by the combination of methyl magnesium iodide with benzalacetophenone, in a molar ratio of from about 1:1 to about 1.75:1.

9. The method of preparing a readily crystallizable polymer which comprises contacting a methyl haloacrylate at a temperature in the range of about −60° to about 100° C. in an inert atmosphere with from about 0.5 to about 50 millimoles per mole of methyl haloacrylate of a catalyst complex formed by the combination of ethyl magnesium chloride and benzalacetophenone, in a molar ratio of from about 1:1 to about 1.75:1.

References Cited in the file of this patent

UNITED STATES PATENTS

| | | |
|---|---|---|
| 2,683,705 | Anspon et al. | July 13, 1954 |
| 2,841,574 | Foster | July 1, 1958 |
| 2,881,156 | Pilar | Apr. 7, 1959 |

OTHER REFERENCES

Landler: Rec. Trav. Chem. Pays-Bas, 68, 992–8 (1949).
Miller et al.: Chem. & Ind., 41, 1323–4 (Oct. 1958).
Fox et al.: J. Am. Chem. Soc., 80, 1768–9 (Apr. 1958).
Schildknecht: "Polymer Processes" (1956), Interscience Publishers, Inc., New York, page 221 relied on.
Chem. Abstracts, Volume 33, page 9282 (1939); Volume 30, page 1783, (1936); and vol. 44, page 8857 (1950).

UNITED STATES PATENT OFFICE
CERTIFICATE OF CORRECTION

Patent No. 3,151,102

September 29, 1964

Abraham Kutner

It is hereby certified that error appears in the above numbered patent requiring correction and that the said Letters Patent should read as corrected below.

Column 1, line 29, strike out "particular monomeric material subjected to the process." and insert instead -- duced with a number of different catalysts, and the crys- --.

Signed and sealed this 9th day of February 1965.

(SEAL)
Attest:

ERNEST W. SWIDER
Attesting Officer

EDWARD J. BRENNER
Commissioner of Patents